United States Patent [19]

de Groot

[11] Patent Number: 4,978,274
[45] Date of Patent: Dec. 18, 1990

[54] MANIPULATOR

[75] Inventor: Rob de Groot, Laag-Zuthem, Netherlands

[73] Assignee: R. de Groot Holding Laag-Zuthem B.V., Zwolle, Netherlands

[21] Appl. No.: 243,162

[22] Filed: Sep. 8, 1988

Related U.S. Application Data

[63] Continuation of Ser. No. 907,311, Sep. 15, 1986, abandoned.

[30] Foreign Application Priority Data

Sep. 16, 1985 [NL] Netherlands .......................... 8502525

[51] Int. Cl.$^5$ ................................ B25J 9/06
[52] U.S. Cl. .................................. 414/744.3; 414/799;
 414/744.8; 414/744.5; 901/21; 901/48; 901/20
[58] Field of Search ........................................ 414/799

[56] References Cited

U.S. PATENT DOCUMENTS

| | | | |
|---|---|---|---|
| 3,631,989 | 1/1972 | McCormick | 414/744 R X |
| 3,706,248 | 12/1972 | Erhart | 83/74 |
| 3,946,298 | 3/1976 | Van de Loo | 318/685 |
| 4,084,083 | 4/1978 | McNally et al. | 901/9 X |
| 4,143,310 | 3/1979 | Fujinawa et al. | 318/571 |
| 4,187,454 | 2/1980 | Ito et al. | 901/7 X |
| 4,435,116 | 3/1984 | Van Deberg | 74/89.15 X |
| 4,561,825 | 12/1985 | Sakata | 901/35 X |
| 4,578,749 | 3/1986 | Kuno et al. | 901/9 X |
| 4,587,618 | 5/1986 | Oguchi | 901/9 X |
| 4,602,345 | 7/1986 | Yokoyama | 901/2 X |
| 4,682,932 | 7/1987 | Yoshino | 901/21 X |
| 4,754,663 | 7/1988 | Yasukawa | 901/21 X |

FOREIGN PATENT DOCUMENTS

| | | | |
|---|---|---|---|
| 716814 | 8/1965 | Canada | 901/17 |
| 1108668 | 9/1981 | Canada . | |
| 2085185 | 1/1970 | France | 901/17 |
| 8201154 | 4/1982 | PCT Int'l Appl. | 901/17 |

Primary Examiner—Frank E. Werner
Assistant Examiner—William M. Hienz
Attorney, Agent, or Firm—Watson, Cole, Grindle & Watson

[57] ABSTRACT

A robotic device has various drives which move a pickup/release mechanism along a compound path of movement between pickup and release positions. Individual drives contribute individually to the compound motion and each is associated with counting unit/memories which control the drives so that the drives initiate motion in rapid mode followed by slow mode and then termination. The apparatus is constructed to minimize inertia forces so that the drives are not required to have high power input and so that the construction may be of light weight.

6 Claims, 4 Drawing Sheets

MANIPULATOR

This application is a continuation of application Ser. No. 06/907,311, filed Sept. 15, 1986, now abandoned.

BACKGROUND AND BRIEF SUMMARY OF THE INVENTION

The invention relates to a manipulator, comprising at least one grab, driving means for moving the grab with a number of translational and/or rotational degrees of freedom, which number can be chosen, and control means coupled with the driving means for moving the grab along a path determined by at least a beginning position and an ending position and wherein is picked up an object in the beginning position and released in the ending position.

Such a manipulator is generally known. In the prior art manipulator, use is made of a feed-back for each degree of freedom by means of which the arrival of the grab at the desired position in that degree of freedom is signalled. Such a system has necessarily a relatively complicated construction as it requires a certain amount of memory space, while furthermore a certain inertia is inherent in the system.

The invention has for its purpose to engineer a manipulator of the type described in such a way that the memory space to be is minimal, so that the computer system used can be of a relatively simple type.

In order to realize this purpose, the invention provides a manipulator which is characterized in that the control means for each degree of freedom comprises a feedback-free counting unit/memory loadable previously in correspondence with the desired displacement in that degree of freedom in such a way that the driving means for each degree of freedom is only operative during an interval in which the contents of the counting unit/memory are smaller than the loaded counting value while the counting unit is also adapted for counting to the loaded counting value after receiving a starting signal, if desired controlled by a program for a desired loading pattern.

In order to ensure that the system is able to operate with a high speed without having the undesired effect that the end point in a degree of freedom is overshot as a result of mechanical inertia in the system, preference is given to that embodiment in which the control means is adapted to control the driving means in a fast speed mode during the beginning of the counting interval and in a slow speed mode during the end of the counting interval.

In a simple embodiment, the counting value for the slow speed mode may be a fixed value.

In a manipulator in which the objects are conveyed successively along a fixed path, use may be made of detection means such as a light source with a photo cell or a micro switch for providing a starting signal to the control means responsive to the arrival of an object.

The grab or pickup/release means may be provided with a detector such as a micro switch which detects when an object has been picked up and when it has been released.

The grab may be of serveral types such as a spoon, a pair of tongs, a fork-element, a vacuum head or the like. In the English literature often reference is made of a pick-up.

The invention now will be explained with reference to the drawing of some arbitrary embodiments to which the invention is not limited. In the drawing:

BRIEF DESCRIPTION OF THE DRAWING

FIG. 3 a strongly simplified block schematic diagram of a central control unit having control means and driving means for the manipulator according to FIGS. 1, 2 and 4;

DETAILED DESCRIPTION

Figure 1:
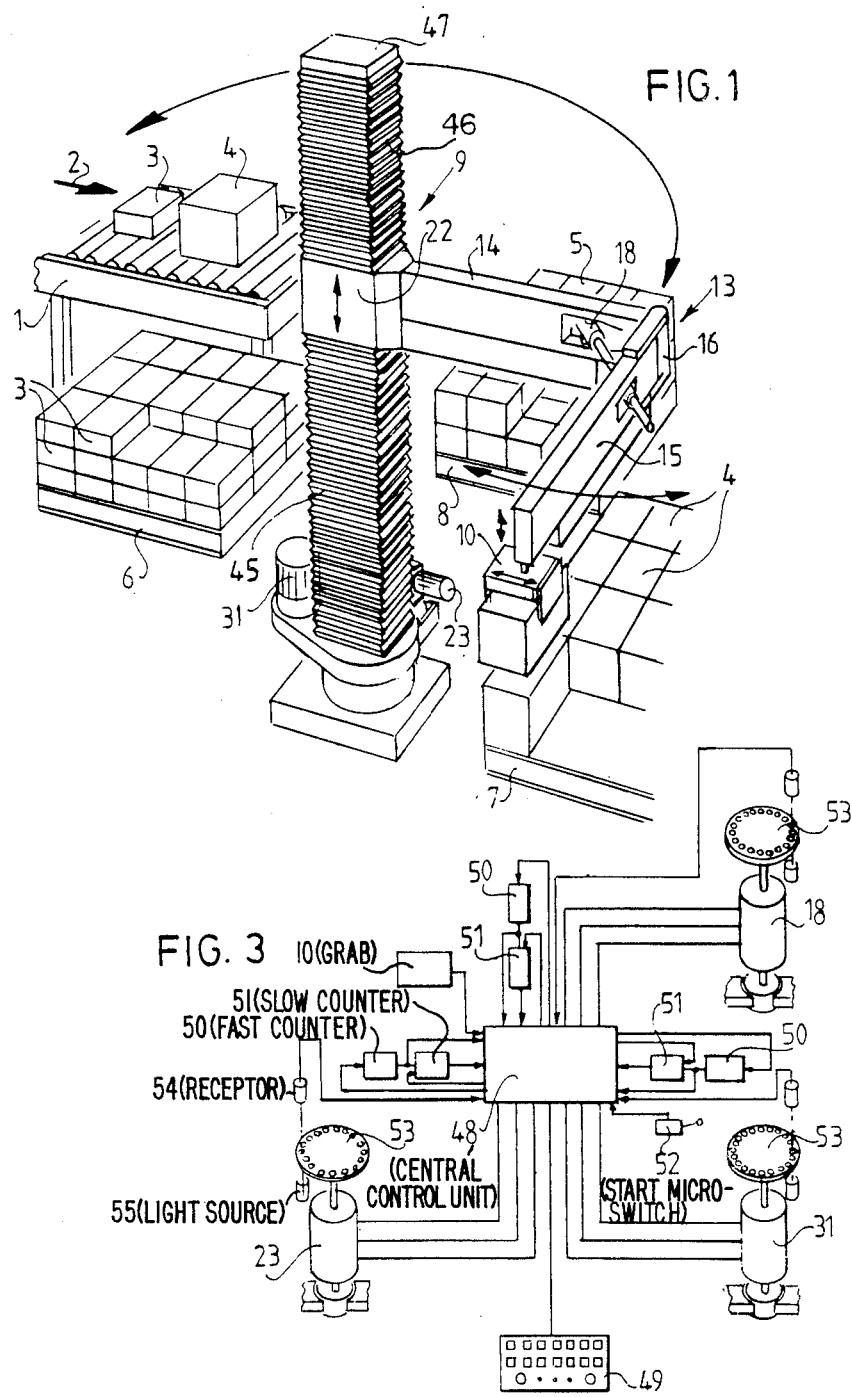
FIG. 1 is a schematic perspective view of a manipulator.

FIG. 1 shows a conveyer 1, along which in accordance with an arrow 2 objects 3, 4 and 5 are conveyed. Objects 3 have to be positioned on a pallet 6, objects 4 on a pallet 7, and objects 5 on a pallet 8. In the present embodiment the loading pattern is very simple, the respective objects are positioned in the same direction uninterruptedly layer by layer on the respective pallets.

Figure 2:
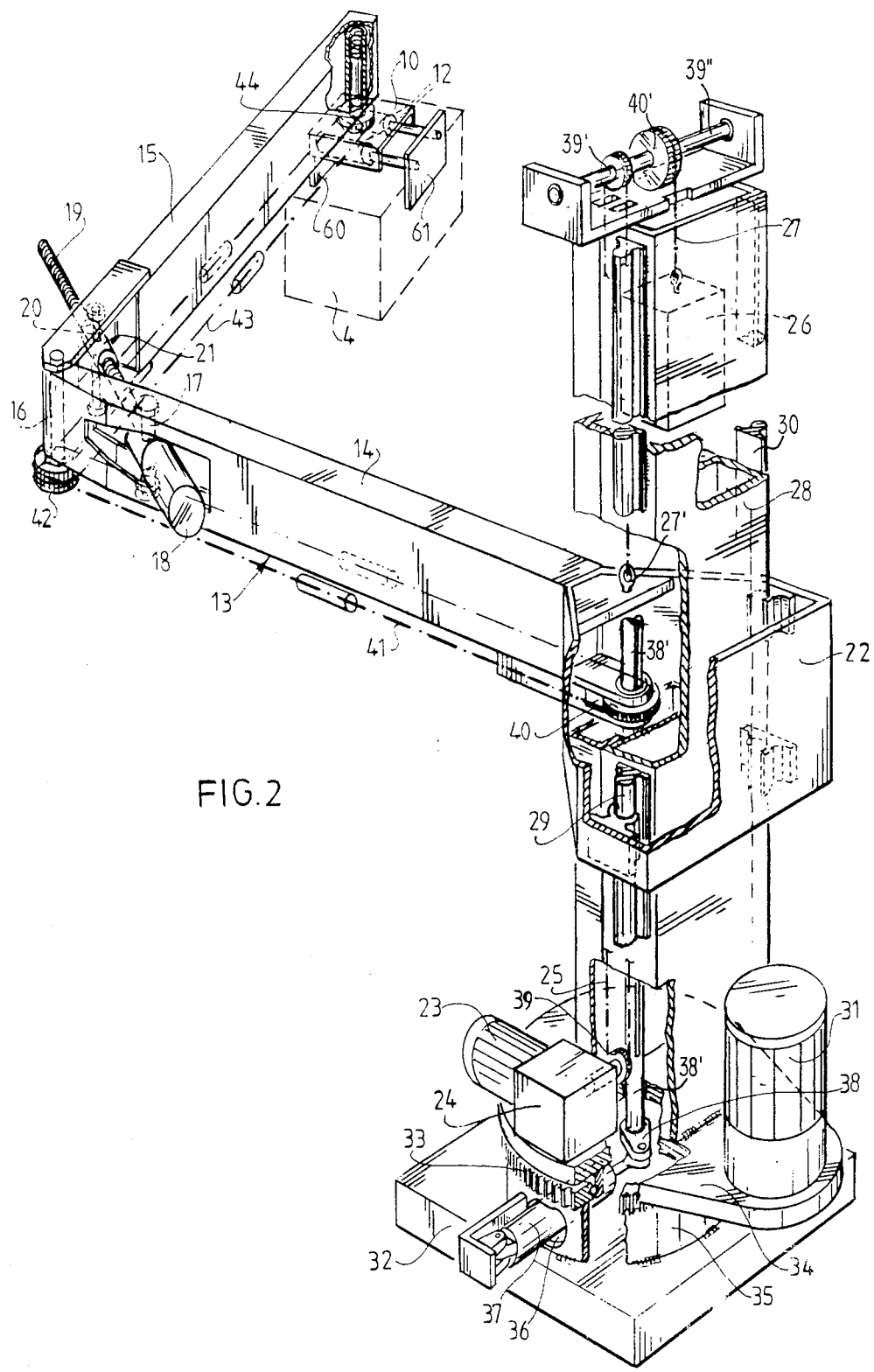
FIG. 2 is a more detailed perspective view, partially broken away of a manipulator according to FIG. 1.

A manipulator 9 comprises a grab 10, the construction of which is shown only schematically in FIG. 1, but more in detail in FIG. 2. As appears from FIG. 2 the grab 10 comprises two clamping plates 60, 61 between which the respective objects may be clamped, the clamping plates being movable by means of pneumatic cylinders 12 in a mutually parallel relation.

The grab 10 is supported by an arm 13 consisting of a first arm half 14 and a second arm half 15, the arm halves 14, 15 being hingeable in the manner of a elbow around an axis 16. The first arm half 14 carries a linearly drivable motor 18 hingeable around an axis 17, the motor being provided with a screw spindle 19 co-operating with a sleeve 21 provided with a threaded hole, the sleeve being coupled with a hinging axis 20 fixed at the second arm half 15.

Arm 13 is carried by a carriage 22, which is movable up and down by means of a motor 23, having a transmission 24 and a chain 25. The transmission 24 has a driving shaft to which the sprocket 39 is keyed and this sprocket is engaged with the chain 25 which is also trained over the sprocket 39' on the shaft 39''. The shaft 39'' is also keyed to the sprocket 40' over which the chain 27 is trained, one end of the chain 27 being dead-ended to the carriage 22 at 27' and the other being connected to the counterweight 26. Due thereto the motor 23 needs to have only a limited power.

The carriage 22 is guided along the beam 28 by means of the guiding rails 29, 30, respectively. The upright beam 28 is rotatably drivable by means of a motor 31 co-operating with a pinion 33 fixed on the supporting frame 32. Motor 31 is supported by a supporting plate 34 fixed on the beam 28 and rotatable together with that beam 28.

The frame 32 carries the pinion 33 through a cylindrical sleeve 35 provided with a hole 36 for receiving a pneumatic cylinder 37. The piston of this cylinder 37 is pivotally connected to the lever 38 cantilevered from the lower end of the axle or shaft 38'. Said shaft 38' carries a pinion 40 and a chain 41 is trained over the two sprockets 40 and 42. The double sprocket 42 is freely rotatable on the shaft 16 which forms the elbow hinge axis between the two arm parts 14 and 15 and the further chain 43 is also trained around the double sprocket 42 and the sprocket 44 at the remote end of the arm part 15. The pinion 44 is fixed to the mechanism 10 so that when the pinion 44 rotates relative to the arm part 15, the pickup/release mechanism 10 changes angularity with respect to the arm part 15. Such rotation of the pinion 44 is effected by operation of the pneumatic cylinder 37 and consequent rotation of the shaft 38' to drive the two chains 41 and 43. At the same time, it will be appreciated that because the shaft 38' does not rotate with the beam 28, separate adjustment of the angularity of the mechanism 10 relative to the arm part 15 may be necessary if the beam 28 is rotated by the motor 31.

That is, if the beam 28 is rotated by operation of the motor 31, the carriage 22 rotates with it and since the arm part 14 is fixed to the carriage 22, the arm 13 will swing in a horizontal plane. However, the sprocket 40 is splined to the shaft 38' which remains stationary during this swinging and in consequence, the angularity of the mechanism 10 relative to the arm part 15 will change. To readjust the angularity of the mechanism 10, energization of the cylinder 37 is effected.

It should be noted that by means of this construction, eliminating the necessity of relatively heavy motors at the end of a manipulator arm, the whole construction may be made lighter of weight, reducing inertia effects and making the construction less heavy.

The direction of screw spindle 19 is parallel with the connection line between shaft 38' and the end of the second manipulator arm half 15, particularly the axis of rotation of pinion 44, by means of which it is obtained that a driving of motor 18 over a number of steps is linearly proportional with the displacement in the direction of grab 10, i.e., the centre of pinion 44.

FIG. 1 furthermore shows a bellows 45 extending between the lower side of carriage 22 and the carrier plate 34. On the one hand this bellows has a "cosmetic" function, and on the other hand serves as safeguarding against the intrusion of dust, dirt and the like and furthermore in order to avoid potential contact of operators with moving parts.

A comparable bellows 46 extends between the upper side of carriage 22 and the upper side of the beam 28, which in accordance with FIG. 1 is covered with a covering plate 47.

FIG. 3 shows a central control unit 48 provided with a control panel 49, the central control unit 48 serving the purpose of controlling driving motors 18, 23 and 31. Each motor has a counting unit/memory added to it. The respective counting units/memories comprise "fast" counters 50 and "slow" counters 51, which are for the sake of ease referred to with the same numerals. After receiving a start signal of a micro switch 52 (not shown in FIG. 1), but positioned at the end of conneyer 1 for signalling the arrival of an object, the central control unit starts the operation of counters 50. The program loaded in advance in the central control unit determines the simultaneous or sequential operation of counters 50, by which the path of the picked-up object is determined. As soon as the end of the loaded counting value of each counter 50 is reached, operation of such counter 50 is taken over by its associated counter 51 which is of a slower type, at least operating for a desired control slower in such a way that the end of the path, as far as it is determined by the related motor, is moved over with a lower speed, until also the end of the loaded counting value in counter 51 is reached. As soon as this is the case the related motor stops. As soon as all three motors 18, 23 and 31 are no longer energized the end of the path is reached and the grab 10, that was energized after receiving the start signal from micro-switch 52, can be de-energized again for releasing on that position the object to be transported.

In order to be able to make positioning as accurate as possible, use may be made of step motors known per se, but it is easier to use an embodiment in which use is made of usual DC-motors performing a rotation measurable by means of an optical disc 53 provided with a plurality of equidistant notches or holes at the circumference. Thus, the light source 54 and aligned receptor 55 may count off the number of steps corresponding with the previously loaded counting value in counter 50 and 51.

Figure 4:
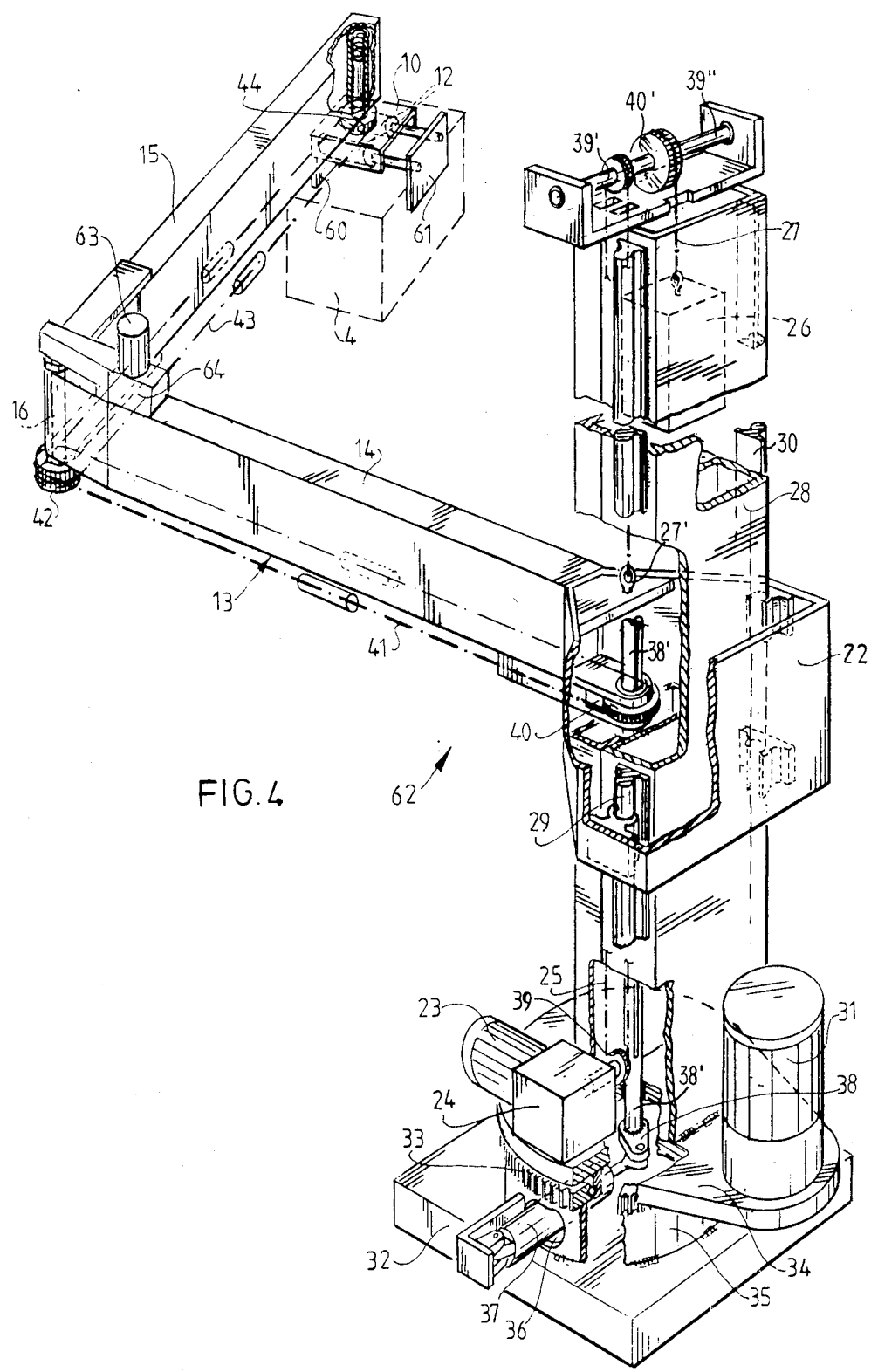
FIG. 4 is a view corresponding with FIG. 2 of a preferred embodiment.

FIG. 4 shows a manipulator in a preferred embodiment of the invention. Manipulator 62 deviates in only one respect with respect to the manipulator shown in FIG. 2. Therefore, in FIG. 4 corresponding parts have been referred to with the same reference numbers as in FIG. 2.

As will be clear from FIGS. 1 and 2, the maximum swing of arm half 15 relative to arm half 14 is limited. In order to solve this limitation in the embodiment of FIG. 4 use is made of a motor 63 fixed to the arm half 14 and which is coupled with a reduction unit 64, the output axis extend in a coaxial relation with hinge axis 16. It will be clear that due to this construction a larger swing may be obtained than in the construction according to FIGS. 1 and 2. In a practical embodiment a maximum swing of more than 270° can be obtained. The reduction unit used is of the type that is commercialized by the firm Daval Gear Company Ltd under the trademark "Duo-drive". The manipulator according to the invention has a very great flexibility which is normally reserved for systems which are appreciably more complicated and thus expensive.

Furthermore it is cheaper than systems having comparable performance by the fact that the construction may be less heavy weight, e.g., due to the ingeneous rotating driving of grab 10.

In the above there was the question of a manipulator taking objects from a conveyor road and positioning them on a pallet according a previously chosen pattern. It will, however, be clear that the manipulator according to the invention is, with adapted programming, also fitted for unloading a pallet and positioning of a picked-up objects on a conveyor.

Figure 5:
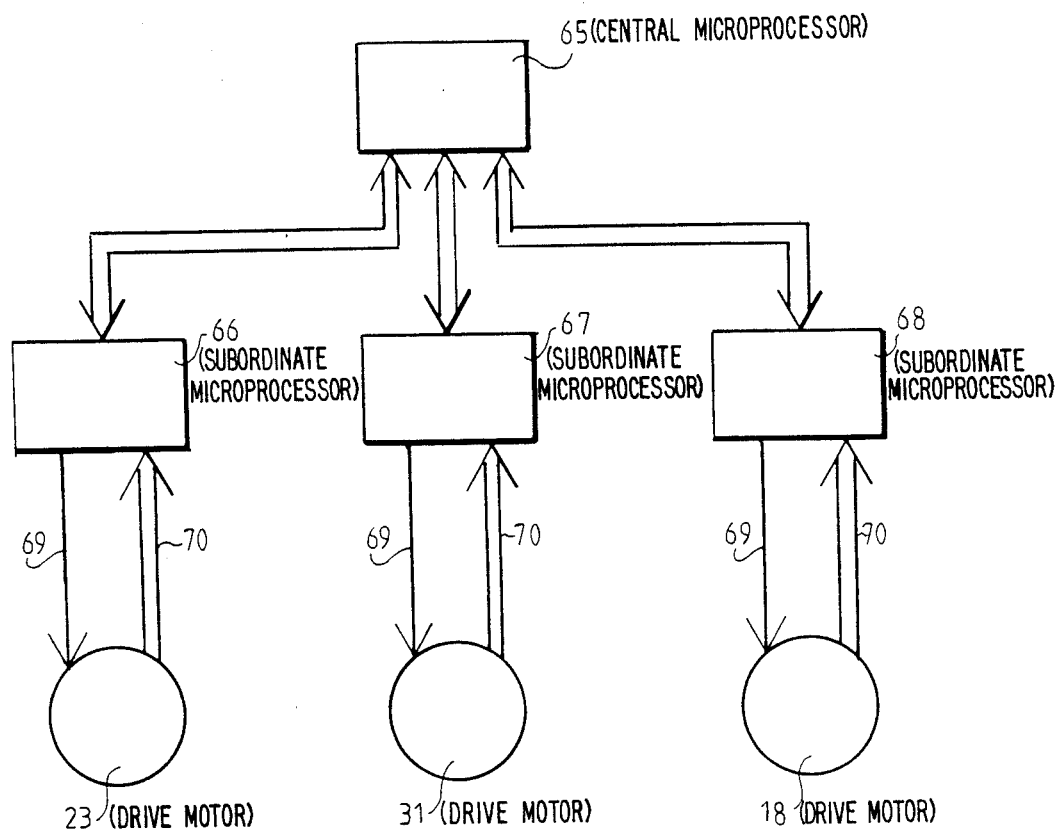
FIG. 5 is a preferred embodiment of a central control unit having control means and driving means for the manipulator according to FIGS. 1, 2 and 4.

FIG. 5 shows a strongly simplified block-schematic diagram of a preferred embodiment of a central control unit having control means and driving means. Use is made of a central microprocessor CM and three subordinate microprocessors 66, 67, and 68, provided with driving means for the respective motors 23, 31 and 18. Lines 69 indicate the energization of the motors. Lines 70 are information lines over which information relative to the number of revolutions and the rotation direction of the respective motors are supplied to the respective microprocessors.

Figure 6:
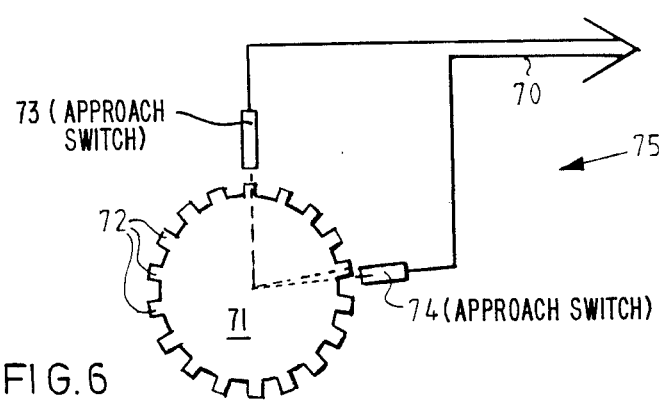
FIG. 6 is a schematic view of a rotation sensor.

FIG. 6 shows a rotation sensor 75, that may be coupled with the output axis of each of motors 23, 31 and 18 (not shown) and which can not only count the number of revolutions thereof, but also their rotational direction. Sensor 75 comprises a disc 71 carrying a plurality (in this case 18) teeth 72, which are arranged in an equidistant manner at the circumference of disc 71. Two inductive approach switches 73, 74 are positioned close to the circumference of the disc so as to be controlled by teeth 72 passing thereby in case of rotation of a motor). The approach switches 73, 74 are positioned in such a way that, relative to the equidistantly arranged teeth 72 they are offs of 90°. For the relative spacing of the approach switches 73, 74 a suitable support means (not shown) can be used. In this way detection of tooth edges may take place in a manner known per se pulses which comprise information relating to the number of passing teeth and therefore the number of revolutions and the direction thereof. Are passed through information line 70 to microprocessors 66, 67, 68 for controlling motors 23, 31 and 18.

Microprocessor 65 comprises the whole control program of microprocessors 66, 67, 68, which, therefore, are programmed more simply. The previously loaded program determines the simultaneous or sequential operation of the several microprocessors determining the path of a picked-up object. Before a loaded coordinate in one of the degrees of freedom is reached the related microprocessor switches the executing organ, i.e., the related motor, to a lower speed so that the final destination is approached more slowly. At the arrival at the final destination the related microprocessor 66, 67, or 68 switches off the motor and advises the umbrella-microprocessor 65 of the arrival at the final position.

Microprocessor 65 supplies each of the subalternate microprocessors 66, 67, 68 three values, namely (a) the end-coordinate, (b) a "half-coordinate" and (c) an "offset"-value. The final end-coordinate is the desired end position in the related degree of freedom.

The half coordinate is a coordinate between a starting position and the end-coordinate. When the half coordinate is reached a signalling takes place that may serve the purpose of, e.g., starting of a movement in an other degree of freedom giving a visual or acoustic signalling etcetera.

The offset-value is that value before reaching the end-coordinate at which a switch has to take place to a smaller speed of displacement.

At the first start of the manipulator each degree of freedom looks for its own fixed reference point.

It will be appreciated that each drive means such as the motors 18, 23 and 31 is independent and each is separately controlled. Each has a counting unit/memory which is loaded in correspondence with the desired displacement for that motor. Thus, in FIG. 3, each motor has two counters 50 and 51 associated with it, the counter 50 being programmed or loaded to contain a specified number of counts which, when its loaded count value is reached, causes the associated counter 51 to operate. When the loaded count values of both counters have counted out or become exhausted, the associated drive motor is no longer operated. The associated drive means such as the motors 18, 23 and 31 are operated in "fast" mode while the contents of the counters 50 are being exhausted, and in "slow" mode when the contents of the counters 51 are being exhausted. The "fast" and "slow" drives assure that inertia plays a minor part in the system. It is a simple matter to so program the drives that each is sufficiently slow during its terminal drive movement that the associated inertia is at the desired low level. In FIG. 5, the preferred form of the control unit of the invention, a main microprocessor CM controls the subsidiary microprocessors 66, 67 and 68, i.e., the latter are slaved to the former. In this case, the main microprocessor CM contains the entire control program for the slaved units. The lines 70 exhaust the memory contents of the slave units in precisely the same manner as is indicated for the counting unit/memories of FIG. 3 and, in either case, it is important to note that the conventional feedback techniques are not employed. That is, the traditional feedback approach wherein the feedback "error" signal is constrained toward zero, is not used. Instead, when the memory content is exhausted, the associated drive is positively terminated. Thus, there is no possiblility for "overshoot" as is conventional for feedback systems. This factor also weighs heavily upon the inertia effect inasmuch as there can be no inherent oscillation as is conventional in feedback systems and the terminal slow drive in each case is abruptly terminated so that inertia effects are wholly predictable and easily accommodated.

I claim:

1. A robotic-type manipulator which can pick up an object at one location and release the object at another location, said manipulator comprising
   a base assembly which includes an upstanding sleeve having a pinion therearound which defines an axis,
   a support assembly movably mounted on said base assembly, said support assembly including a support plate positioned above said upstanding sleeve and a vertical beam mounted on said support plate,
   a first motor means which is mounted on said support plate and is engaged with said pinion to rotate said support assembly around said upstanding sleeve,
   a carriage which is movable along said vertical beam,
   a second motor means mounted on said support plate and connected to said carriage to move said carriage along said vertical beam,
   a vertical shaft positioned within said vertical beam so as to be coaxial with said axis of said pinion and to define a first pivot axis,
   a drive means for rotating said vertical shaft about said first vertical pivot axis,
   an arm assembly which includes a first horizontal arm which has a first end and a second end, said first end being fixedly connected to said carriage and said second end defining a second vertical pivot axis; a second horizontal arm which has a first end and a second end, said first end of said second arm being pivotally connected to said second end of said first arm and said second end of said second arm defining a third vertical pivot axis, and a pickup/release means mounted on said third pivot axis,
   third motor means for rotating said second arm about said second pivot axis relative to said first arm,
   endless drive means extending from said first pivot axis to said second pivot axis and from said second pivot axis to said third pivot axis for rotation about said first, second and third pivot axes in unison and so that rotation of said vertical shaft will cause rotation of said pickup/release means without imparting motion to said first or second arms, and
   control means connected to said first, second and third motor means for independently controlling their operation so that a compound path of movement created by said support assembly rotating about said base assembly, said carriage moving along said vertical beam and said second arm rotating relative to said first arm will occur and then stop, said control means including a first programmed memory for actuating the first drive motor during that time period required to operate the first drive motor during its contribution to the compound path of movement, a second programmed memory for actuating the second drive motor during that time period required to operate the second drive motor during its contribution to the compound path of movement, a third programmed memory for actuating the third drive motor during that time period required to operate the third drive motor during its contribution to the compound path of movement, and means for programming each of said first, second and third memories with a programmed number of counting signals prior to initial movement of the associated drive motor, the first, second and third drive motors each including counter means responsive to its independent contribution to the compound path of movement for respectively depleting the number of counting signals programmed into its respective memory and wherein the counter means vary the speed of each associated drive motor so that each associated drive motor is slowed, before being stopped, during the terminal portion of its motion in moving between pickup and release positions.

2. A robotic-type manipulator as defined in claim 1, wherein said drive means for rotating said vertical shaft about said first pivot axis comprises a pneumatic piston/cylinder device which is connected by a cantilever element to said vertical shaft.

3. A robotic-type manipulator as defined in claim 1, wherein said third motor means comprises a linearly-drivable motor having a screw spindle, wherein a threaded sleeve is pivotally connected to one of said first and second arms, wherein said linearly-drivable motor is pivotally connected to the other of said first and second arms, and wherein said screw spindle is threadingly engaged in said threaded sleeve.

4. A robotic-type manipulator as defined in claim 1, wherein said third motor means comprises a motor and a reduction unit connected to said motor, said reduction unit having an output axis which is coaxial with said second vertical pivot axis.

5. A robotic-type manipulator as defined in claim 1, including a sprocket which is spliced to said vertical shaft, and wherein said endless drive means comprises a chain that is wrapped around said sprocket.

6. A robotic-type manipulator as defined in claim 1, including a horizontal shaft having first and second sprockets mounted at an upper end of said vertical beam, an endless first connector chain extending form said second motor means and wrapped around said first sprocket, a counterweight, and a second connector chain which is attached at opposite ends to said carriage and said counterweight, respectively, and which extends around said second sprocket, such that movement of said endless first connector chain by said second motor means will cause said second sprocket to move said second connector chain and thus said carriage along said vertical beam.

* * * * *